US012607266B2

(12) United States Patent
Humes

(10) Patent No.: US 12,607,266 B2
(45) Date of Patent: Apr. 21, 2026

(54) DOUBLE BELLOWS VALVE FOR PREVENTING UNDESIRED VALVE FAILURE POSITIONS

(71) Applicant: Rolls-Royce North American Technologies Inc., Indianapolis, IN (US)

(72) Inventor: Ryan C. Humes, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 20 days.

(21) Appl. No.: 18/984,280

(22) Filed: Dec. 17, 2024

(65) Prior Publication Data

US 2025/0116338 A1 Apr. 10, 2025

Related U.S. Application Data

(63) Continuation of application No. 18/103,036, filed on Jan. 30, 2023, now abandoned.

(51) Int. Cl.
*F16K 31/126* (2006.01)
*F16K 1/36* (2006.01)

(52) U.S. Cl.
CPC .............. *F16K 1/36* (2013.01); *F16K 31/126* (2013.01)

(58) Field of Classification Search
None
See application file for complete search history.

(56) References Cited

U.S. PATENT DOCUMENTS

| | | | |
|---|---|---|---|
| 1,758,644 A | 5/1930 | Betts | |
| 2,540,193 A | 2/1951 | Preston | |
| 2,838,067 A | 6/1958 | Jones | |
| 2,919,102 A | 12/1959 | Peters | |
| 3,087,511 A | 4/1963 | Abild | |
| 3,315,700 A | 4/1967 | Greenwood | |
| 3,826,465 A | 7/1974 | Whittaker et al. | |
| 3,858,842 A | 1/1975 | Yoshimura | |
| 4,271,859 A | 6/1981 | Lawsing | |
| 4,273,150 A | 6/1981 | Paduch et al. | |
| 4,476,682 A * | 10/1984 | McInerney | F02B 37/186 60/602 |
| 4,735,232 A | 4/1988 | Apostoly | |
| 5,954,341 A | 9/1999 | Ringer et al. | |
| 8,083,205 B2 | 12/2011 | Sneh | |
| 8,511,333 B2 | 8/2013 | Takeda et al. | |
| 8,549,864 B2 | 10/2013 | Langdon et al. | |
| 9,353,952 B2 | 5/2016 | Overby et al. | |
| 10,337,411 B2 | 7/2019 | Miranda et al. | |
| 10,712,007 B2 | 7/2020 | Widener | |
| 10,738,712 B2 | 8/2020 | Widener | |

(Continued)

FOREIGN PATENT DOCUMENTS

| | | |
|---|---|---|
| CN | 210344511 | 4/2020 |
| FR | 2575240 | 6/1986 |

*Primary Examiner* — Umashankar Venkatesan
(74) *Attorney, Agent, or Firm* — Barnes & Thornburg

(57) ABSTRACT

A gas turbine engine includes a combustor and a valve coupled to the combustor. The valve includes a valve body, a valve stem, and an actuator. The valve body is formed to define an air chamber. The valve stem is movable between a closed position and an open position. The actuator is configured to move selectively the valve stem between the closed position and the open position.

20 Claims, 6 Drawing Sheets

(56) References Cited

U.S. PATENT DOCUMENTS

| | | | |
|---|---|---|---|
| 10,871,260 | B2 | 12/2020 | Murawski |
| 11,466,793 | B1 | 10/2022 | Parish et al. |
| 11,649,931 | B2 | 5/2023 | Murawski |
| 11,867,089 | B1 | 1/2024 | Humes |
| 2017/0097095 | A1 | 4/2017 | Iguchi |
| 2022/0186855 | A1 | 6/2022 | Gentile et al. |

* cited by examiner

DOUBLE BELLOWS VALVE FOR PREVENTING UNDESIRED VALVE FAILURE POSITIONS

CROSS REFERENCE TO RELATED APPLICATIONS

This application is a continuation of and claims priority to and the benefit of U.S. patent application Ser. No. 18/103,036, filed 30 Jan. 2023, the disclosure of which is now expressly incorporated herein by reference.

FIELD OF THE DISCLOSURE

The present disclosure relates generally to gas turbine engines, and more specifically to bellows valves adapted for use in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high-pressure air to the combustor. In the combustor, fuel is mixed with the high-pressure air and is ignited. Products of the combustion reaction in the combustor are directed into the turbine where work is extracted to drive the compressor and, sometimes, an output shaft. Leftover products of the combustion are exhausted out of the turbine and may provide thrust in some applications.

Compressors and turbines typically include alternating stages of static vane assemblies and rotating wheel assemblies. Cooling air may be used to cool the vanes and/or the blades in the turbine. The amount of cooling may depend on a few factors such as desired life, temperatures, and/or mission.

Valves are used to control the amount of cooling air that is used to cool the vanes and/or the blades of the turbine. If a valve fails, it may fail in either an open or a closed position depending on the design of the valve. Failure of a valve in an undesirable position may result in undercooling of the turbine or other undesirable effect.

SUMMARY

The present disclosure may comprise one or more of the following features and combinations thereof.

A valve may comprise a valve body formed to define an air chamber therein, a valve stem configured to move between a closed position and an open position, and an actuator configured to move selectively between the closed position and the open position. The valve body may be formed to define a supply inlet, a pilot inlet, an upstream flow inlet, and a downstream flow outlet. The supply inlet may allow control air to enter the air chamber, the pilot inlet may allow pilot air into the air chamber, and the upstream flow inlet may allow working air to enter the air chamber. Meanwhile, the downstream flow outlet may selectively allow the working air to exit the valve body through the downstream flow outlet.

In the closed position, the valve stem may block the downstream flow outlet such that the working air is blocked from flowing out of the air chamber. In the open position, the valve stem may allow the working air to flow through the downstream flow outlet.

The actuator may include a first bellows coupled with the valve stem to define a working fluid chamber that is in fluid communication with the upstream flow inlet and the downstream flow outlet when the valve stem is in the open potion. The actuator may further include a second bellows coupled with the valve stem and the valve body to define a supply fluid chamber in fluid communication with the supply inlet. The valve body, the first bellows, and the second bellows may cooperate to define a pilot fluid chamber that is in fluid communication with the pilot inlet.

In some embodiments, the valve stem may include a rod, a seat, and a mount flange. The second bellows may be coupled with the mount flange and the valve body. In some embodiments, the first bellows may be coupled with the valve body and the seat. In some embodiments, the first bellows may be coupled with the valve body and the mount flange.

In some embodiments, the valve body may include a sidewall that extends circumferentially around an axis, a top wall, and a bottom wall. In some embodiments, the pilot inlet may be formed in the sidewall. In some embodiments, the second bellows may be positioned axially from the first bellows relative to the axis. In some embodiments, the pilot inlet may be formed in the bottom wall. In some embodiments, the second bellows may be radially outward of the first bellows such that the second bellows encloses the first bellows. In some embodiments, the valve body is formed to include a valve stop that extends axially away from the top wall to block axial movement of the valve stem opposite the upstream flow inlet pas the open position to prevent failure of the first bellows.

According to another aspect of the present disclosure, a valve may comprise a valve body formed to define an air chamber therein, a valve stem configured to move between a closed position and an open position, and an actuator configured to move selectively the valve stem between the closed position and the open position. The valve body may be formed to define a first inlet, a second inlet, a third inlet, and an outlet. The first inlet may allow a first air to enter the air chamber, the second inlet may allow a second air into the air chamber, and the third inlet may allow a third air to enter the air chamber. Meanwhile, the outlet may selectively allow the third air to exit the valve body through the outlet.

In the closed position, the valve stem may block the outlet such that the third air is blocked from flowing out of the air chamber. In the open position, the valve stem may allow the third air to flow through the outlet.

The actuator may include a first bellows coupled with the valve stem to define a first fluid chamber that is in fluid communication with the third inlet and the outlet when the valve stem is in the open potion. The actuator may further include a second bellows coupled with the valve stem and the valve body to define a second chamber in fluid communication with the first inlet. The valve body, the first bellows, and the second bellows may cooperate to define a third chamber that is in fluid communication with the second inlet.

In some embodiments, the valve stem may include a rod, a seat, and a mount flange. The second bellows may be coupled with the mount flange and the valve body. In some embodiments, the first bellows may be coupled with the valve body and the seat. In some embodiments, the first bellows may be coupled with the valve body and the mount flange.

In some embodiments, the valve body may include a sidewall that extends circumferentially about an axis, a top wall, and a bottom wall. In some embodiments, the second inlet may be formed in the sidewall. In some embodiments, the second bellows may be positioned axially from the first bellows relative to the axis. In some embodiments, the second inlet may be formed in the bottom wall. In some embodiments, the second bellows may be radially outward of the first bellows such that the second bellows encloses the first bellows. In some embodiments, the valve body may be formed to include a valve stop that extends axially away from the top wall to block axial movement of the valve stem opposite the third inlet past the open position to prevent failure of the first bellows.

These and other features of the present disclosure will become more apparent from the following description of the illustrative embodiments.

DETAILED DESCRIPTION OF THE DRAWINGS

Figure 1:
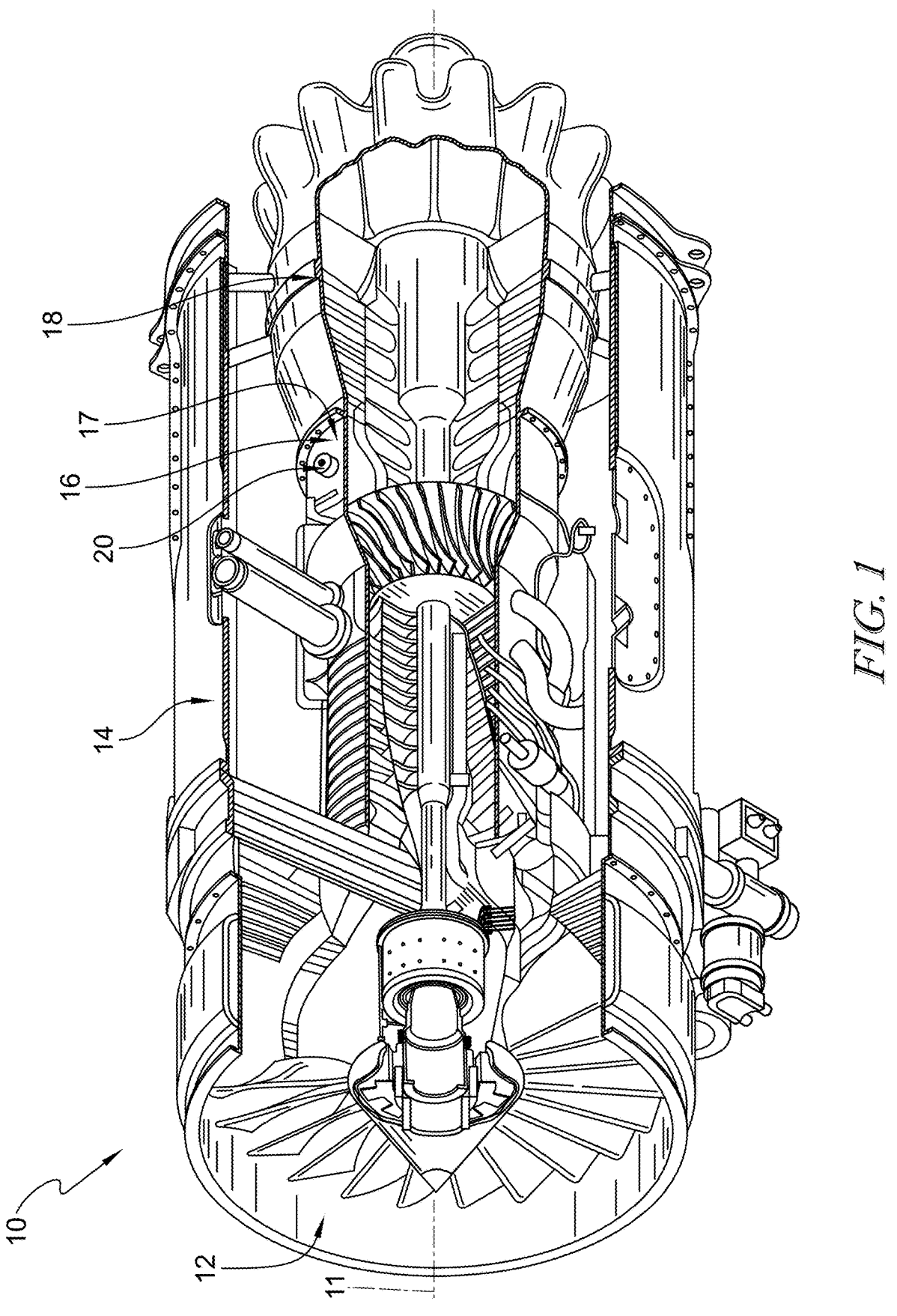
FIG. 1 is a cut away perspective view of a gas turbine engine showing that the engine includes a fan, a compressor, a combustor fluidly coupled to the compressor, a turbine fluidly coupled to the combustor, and a valve configured to control a flow of cooling air of air to the turbine.

For the purposes of promoting an understanding of the principles of the disclosure, reference will now be made to a number of illustrative embodiments illustrated in the drawings and specific language will be used to describe the same.

Figure 2:
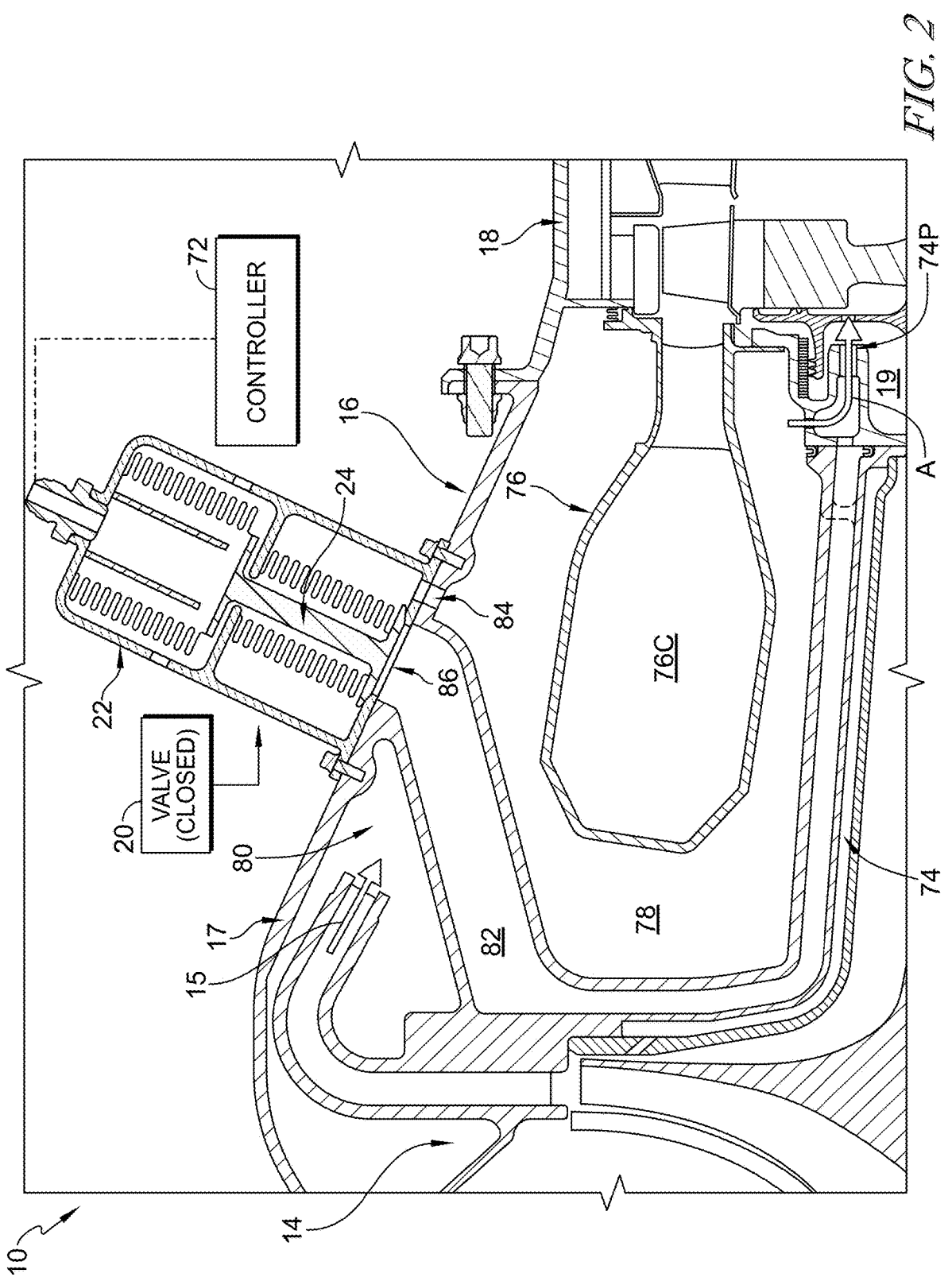
FIG. 2 is a cross section view of the gas turbine engine of FIG. 1 showing that the valve is coupled to the combustor and includes a valve body formed to define an air chamber therein, a valve stem configured to move between a closed position and an open position, and an actuator including a first bellows and a second bellows.

An illustrative gas turbine engine 10 includes a fan 12, a compressor 14, a combustor 16 fluidly coupled to the compressor 14, a turbine 18 fluidly coupled to the combustor 16, and a valve 20 as shown in FIGS. 1-2. The valve 20 is configured to provide a flow of cooling air to the turbine 18 for component cooling by default. As such, in the event of failure within the valve 20, the turbine 18 is always provided with cooling air.

The fan 12 is driven by the turbine 18 and provides thrust for propelling an aircraft. The compressor 14 compresses gases entering the engine 10. The compressor 14 delivers the compressed gases to the combustor 16. The combustor 16 mixes fuel with the compressed gases and ignites the fuel to produce hot, high pressure combustion products. The hot, high pressure combustion products of the combustion reaction in the combustor 16 are directed into the turbine 18 to cause the turbine 18 to rotate about an axis 11 of the gas turbine engine 10. The turbine 18 extracts mechanical work from the hot, high pressure combustion products to drive the compressor 14 and the fan 12.

The valve 20 is configured to open and close to control a flow of cooling air to the turbine 18. When open, the valve

20 is configured to provide a flow of cooling air to a cavity 19 located axially between the combustor 16 and the turbine 18. When closed, the valve 20 blocks the flow of cooling air to the cavity 19 and, thus, blocks the flow of cooling air to the turbine 18. In other words, the flow of cooling air is a portion of the total flow of air provided to the turbine 18.

The combustor 16 includes an outer combustor case 17, an inner combustor case 74, and a combustion liner 76 as shown in FIG. 2. The outer combustor case 17 and the inner combustor case 74 cooperate to define a combustion chamber 78. The combustion liner 76 is located in the combustion chamber 78 and defines a combustion zone 76C. The compressor 14 delivers compressed gases 15 to the combustion chamber 78 of the combustor 16. The fuel is mixed with the compressed gases 15 in the combustion liner 76 before it is ignited to provide the hot, high pressure combustion products.

Because the components of the turbine 18 are subjected to the hot, high pressure combustion products from the combustor 16, the turbine 18 may be cooled during operation of the gas turbine engine 10. Thus, some of the compressor air from the compressor 14 may be used to cool the vanes and/or the blades in the turbine 18. A minimum amount of cooling air may be provided to the turbine 18 through a cooling passage 74P formed in the inner combustor case 74. The cooling passage 74P may open into the cavity 19. The valve 20 of the present disclosure is configured to provide a flow of cooling air that may be in addition to the minimum amount of cooling air.

The valve 20 of the present disclosure may be comprised within a cooling air system as described in U.S. patent application Ser. No. 17/880,276, filed Aug. 3, 2022, which is incorporated by reference herein. However, the valve 20 may be utilized in any gas turbine application where a default continuous airflow is desired. In the present embodiment, the compressor cooling air is supplied by the air discharged from compressor 14 and located around the combustion chamber as suggested in FIG. 2.

Figure 3:
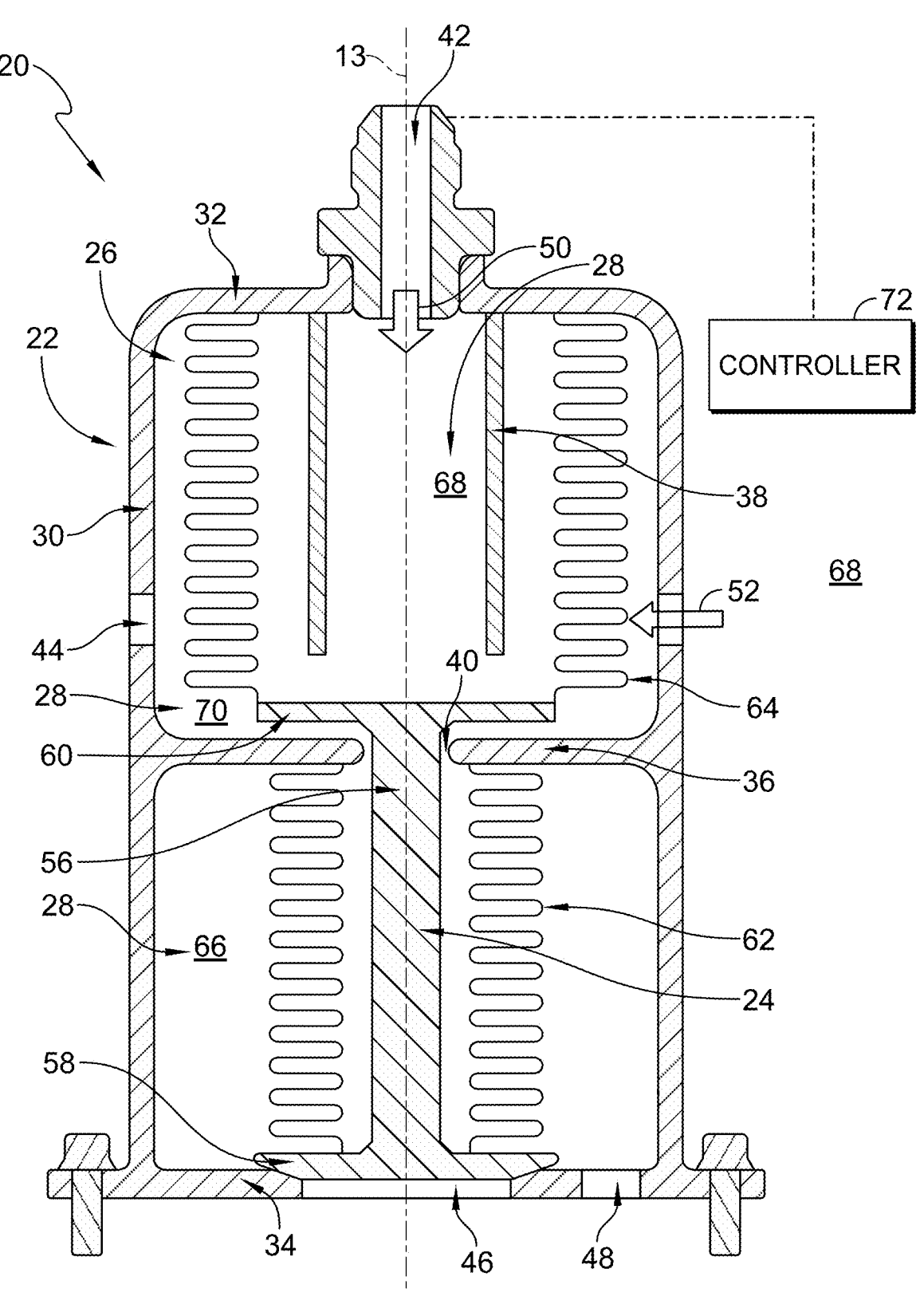
FIG. 3 is a cross section view of the valve of FIG. 2 showing the valve in the closed position.
Figure 4:
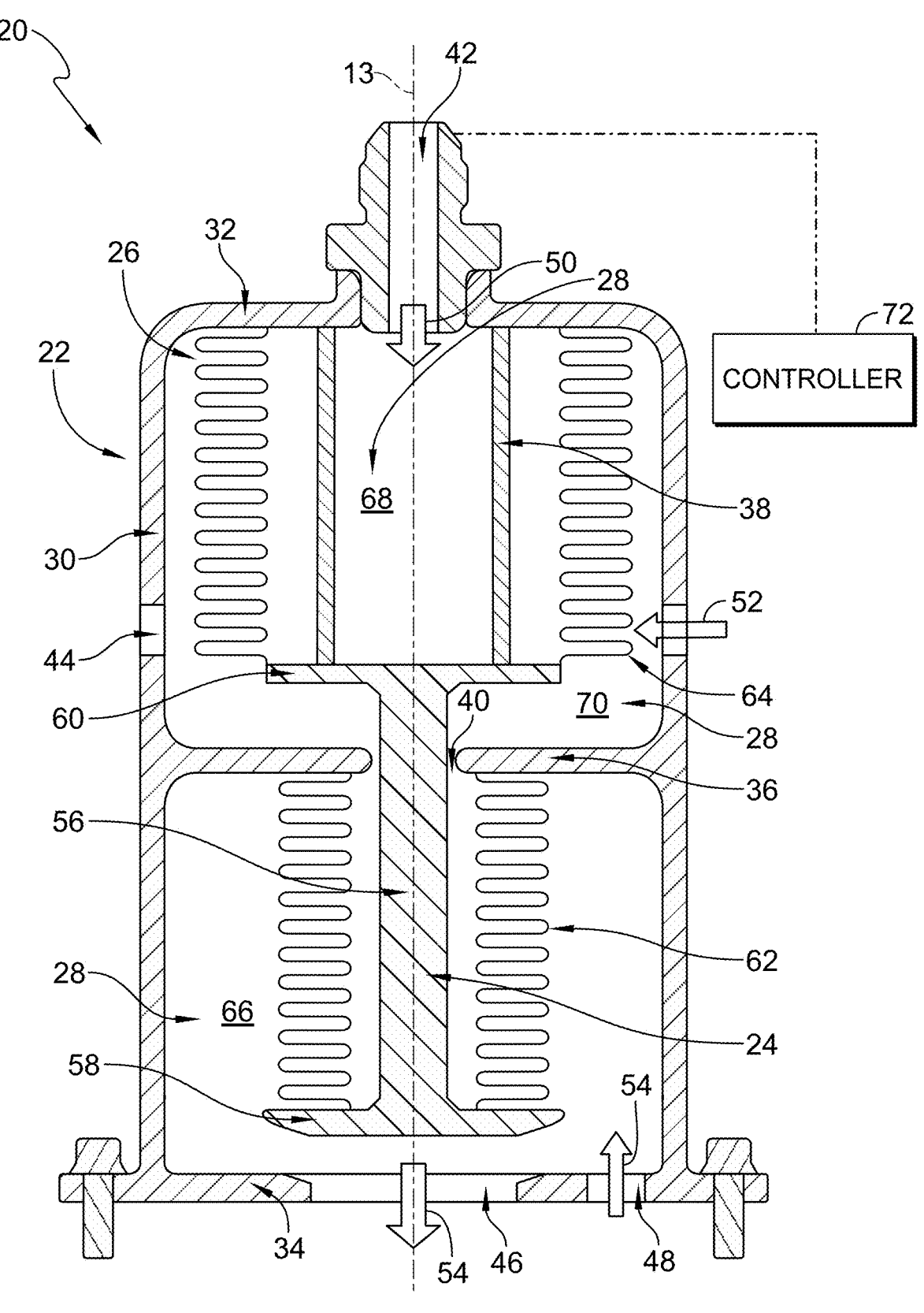
FIG. 4 is a cross section view of the valve of FIG. 3 showing the valve in the opened position.

The combustor 16 may further comprise a cooling duct 80 coupled with the outer combustor case 17. The cooling duct 80 is arranged to extend along at least a portion of the inner combustor case 74 to define a transfer passageway 82 in fluid communication with the combustion chamber 78 and the cavity 19. Accordingly, the valve 20 is configured to change between a closed position as shown in FIGS. 2 and 3 and an open position as shown in FIG. 4. In the closed position, the valve 20 blocks fluid communication between the cooling duct 80 and the combustion chamber 78. In the open position, the valve 20 allows fluid communication between the cooling duct 80 and the combustion chamber 78 to provide a flow of cooling air into the cavity 19 via the transfer passageway 82.

The valve 20 is coupled with the outer combustor case 17 of the combustor 16 as shown in FIG. 2. The valve 20 includes a valve body 22, a valve stem 24, and an actuator 26 as shown in FIGS. 3 and 4. The valve body 22 is formed to define inlets and outlets for various air flows as described in further detail below, and is also formed to define an air chamber 28 therein. The valve stem 24 is configured to move between a closed position, shown in FIG. 3, and an open position, shown in FIG. 4, to control the flow of air through the valve 20. The actuator 26 is configured to move selectively the valve stem 24 between the closed position and the open position. In the illustrative embodiment, the entire valve 20 is located radially outward of the outer combustor case 17 as shown in FIG. 2. This allows the valve 20 to be easily replaced.

The valve body 22 includes a sidewall 30 that extends circumferentially around an axis 13 of the valve 20, a top wall 32, a bottom wall 34 spaced axially from the top wall 32, a median wall 36, and a valve stop 38 as shown in FIGS. 3 and 4. The median wall 36 extends radially inward from the sidewall 30 and is axially spaced between the top wall 32 and the bottom wall 34. The median wall 36 cooperates with the valve stem 24 to define a passageway 40 therebetween for airflow within a portion of the air chamber 28. The valve stop 38 extends axially away from the top wall 32 towards the bottom wall 34 to block axial movement of the valve stem 24 past the open position towards the top wall 32 to prevent failure of the actuator 26.

The valve body 22 is also formed to define a supply inlet 42, a pilot inlet 44, an upstream flow inlet 48, and a downstream flow outlet 46 as shown in FIGS. 3 and 4. The supply inlet 42 is formed in the top wall 32 and is adapted to allow control air 50 to enter the air chamber 28. The pilot inlet 44 is formed in the sidewall 30 axially above the median wall 36 and allows pilot air 52 into and out of the air chamber 28 as the valve 20 is actuated. The upstream flow inlet 48 is formed in in the bottom wall 34 and allows working air 54 to enter the air chamber 28. The downstream flow outlet 46 is also formed in the bottom wall 34 radially inward of the upstream flow inlet 48 and selectively allows the working air 54 to exit the valve body 22 through the downstream flow outlet 46. The upstream flow inlet 48 and the downstream flow outlet 46 may be radially aligned with an inlet aperture 84 and outlet aperture 86 formed in the outer combustor case 17, respectively. The inlet aperture 84 fluidly connects the valve 20 and the combustion chamber 78 and the outlet aperture 86 fluidly connects the valve 20 and the transfer passageway 82. The working air 54 is provided by upstream components of the gas turbine engine 10, such as the compressor 14.

The valve stem 24 includes a rod 56, a seat 58 coupled to the rod 56, and a mount flange 60 spaced axially from the seat 58 and coupled to the rod 56 as shown in FIGS. 3 and 4. The rod 56 defines the axial displacement of the actuator 26. The seat 58 is configured to block the downstream flow outlet 46 when the valve 20 is in the closed position. The mount flange 60 is coupled to at least a portion of the actuator 26 and is adapted to contact the valve stop 38 when the valve 20 is in the open position.

The actuator 26 includes a first bellows 62 and a second bellows 64. The first bellows 62 is coupled with the seat 58 and the median wall 36 to define a working fluid chamber 66. The working fluid chamber 66 is in fluid communication with the upstream flow inlet 48 and the downstream flow outlet 46 when the valve stem 24 is in the open position. The second bellows 64 is coupled with the mount flange 60 and the top wall 32 to define a supply fluid chamber 68. The supply fluid chamber 68 is in fluid communication with the supply inlet 42. Additionally, the valve body 22, the first bellows 62, and the second bellows 64 cooperate to define a pilot fluid chamber 70. The pilot fluid chamber 70 is in fluid communication with the pilot inlet 44. In the illustrative embodiment, the first bellows 62 is radially inward of the second bellows 64.

The valve stem 24 is movable between the closed position and the open position. In the closed position, the valve stem 24 blocks the downstream flow outlet 46 so that the working air 54 is blocked from flowing out of the working fluid chamber 66. In the open position, the valve stem 24 allows the working air 54 to flow through the downstream flow outlet 46. In the open position, cooling (e.g., working) air 54 can be delivered to the turbine 18 to cool turbine components.

In the open position, any control air 50 inside the supply fluid chamber 68 and the pilot air 52 inside the pilot fluid chamber 70 is ambient and/or a lower pressure than the working air 54. Meanwhile, the working air 54 has a first pressure equal to or about a first compressor discharge pressure inside the working fluid chamber 66. On the other hand, in the closed position, any control air 50 inside the supply fluid chamber 68 and any working air 54 inside the working fluid chamber 66 has a second pressure equal to or about a second compressor discharge pressure. Both the first pressure and the second pressure are greater than the ambient pressure. Meanwhile, the pilot air 52 inside the pilot fluid chamber 70 is ambient and/or a lower pressure than the control air 50 and/or the working air 54.

The valve 20 is configured to direct the valve stem 24 to move to or remain in the open position in response to either a failure of the first or second bellows 64, 66, or the control air 50 entering the supply inlet 42. In other words, the valve 20 is configured to mechanically always be open even if various components of the valve 20 should fail. Therefore, the default position for the valve 20 is the open position to ensure that cool (e.g., working) air is delivered to the turbine 18.

For example, if the first bellows 62 fails, then the working air 54 at the first pressure can distribute into both the working fluid chamber 66 and the pilot fluid chamber 70 and combine with the pilot air 52. In this scenario, the combined working fluid chamber 66 and the pilot fluid chamber 70 is not contaminated with any control air 50 from the supply fluid chamber 68. Furthermore, combined air 52, 54 that is at a higher pressure than ambient air is not sealed inside the pilot fluid chamber 70, but rather escapes to ambient air via pilot inlet 44. This keeps pilot fluid chamber 70 at a low enough pressure to allow the actuator 26 to function normally: closing when there is higher pressure air in the supply fluid chamber 68 and opening then there is lower pressure air in the supply fluid chamber 68. In other words, the pilot inlet 44 keeps the pilot fluid chamber 70 at a lower pressure to maintain the pressure delta across the second bellows 64. Pilot inlet 44 may be sized to keep the leak of working air 54 small while still allowing sufficient working air 54 to exit through downstream flow outlet 46 to cool the turbine 18.

Similarly, if the second bellows 64 fails, then the control air 50 will leak into the pilot fluid chamber 70. In this scenario, the working air 54 in the working fluid chamber 66 is not contaminated with any pilot air 52 or control air 50. Furthermore, combined air 50, 52, that is at a higher pressure than ambient air, is not sealed inside the pilot fluid chamber 70. Rather, the combined air 50, 52 escapes to ambient air via pilot inlet 44. The higher pressure of working air 54 in working fluid chamber 66 relative to pilot fluid chamber 70 will cause the valve stem to move to or remain in the open position since there is no pressure delta across the failed second bellows 64.

Finally, if there is a failure in supply inlet 42 or in the lines connecting controller 72 to inlet 42, then control air 50 entering the valve 20 will drop to ambient. The valve 20 is configured such that ambient air in supply fluid chamber 68 will cause the valve stem to move to or remain in the open position.

In the present use in the gas turbine engine 10, failing in the open position is desired over the closed position. If the valve 20 fails in the closed position, then the cooling (e.g., working) air 54 to cool is cut from the turbine 18. In the overall function of the turbine 18, the preference is to continuously supply cool air to the turbine 18 rather than undercool the turbine 18 due to the turbine 18 being subject to hot, high pressure combustion products from the combustor as described above.

Figure 5:
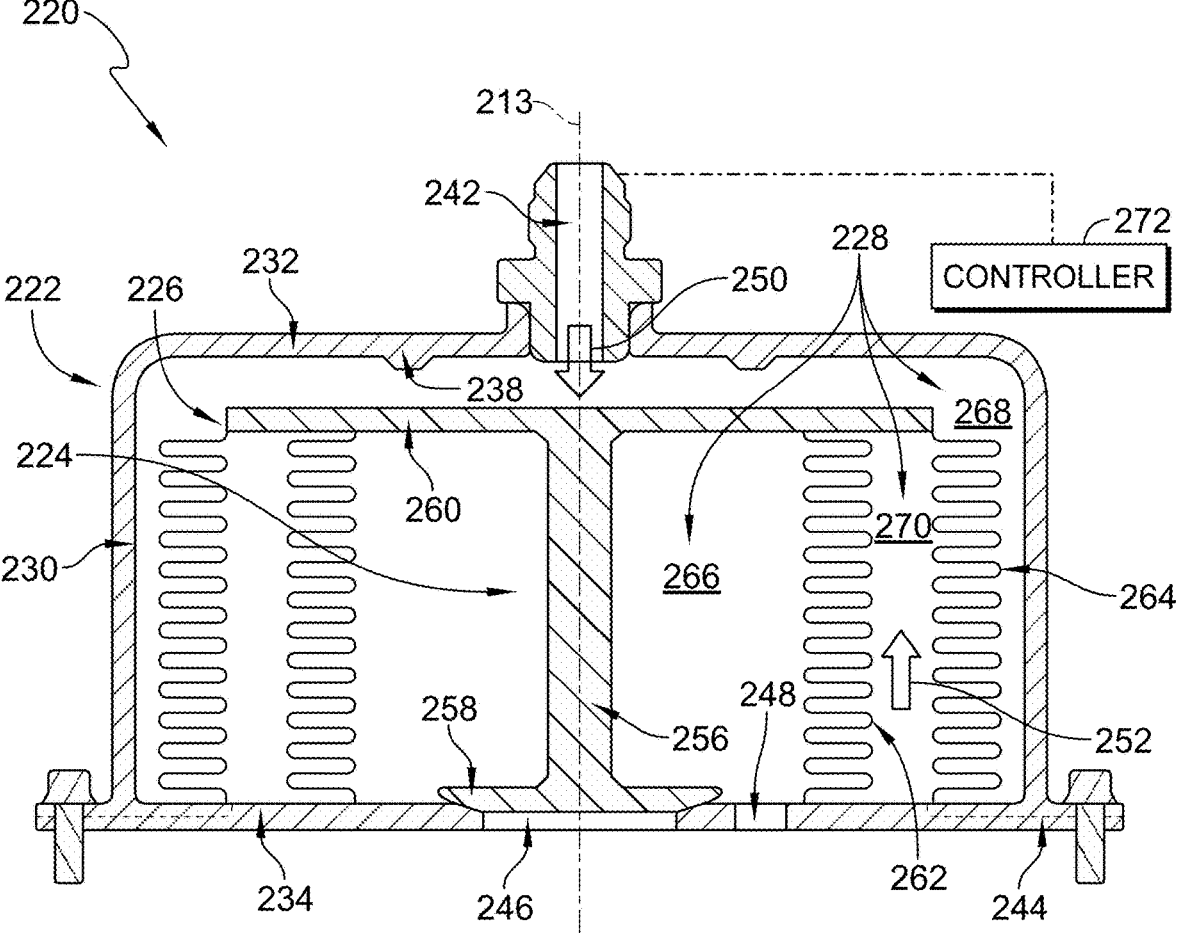
FIG. 5 is a cross section view of another embodiment of a valve adapted for use with the gas turbine engine of FIG. 1 showing the valve in the closed position.
Figure 6:
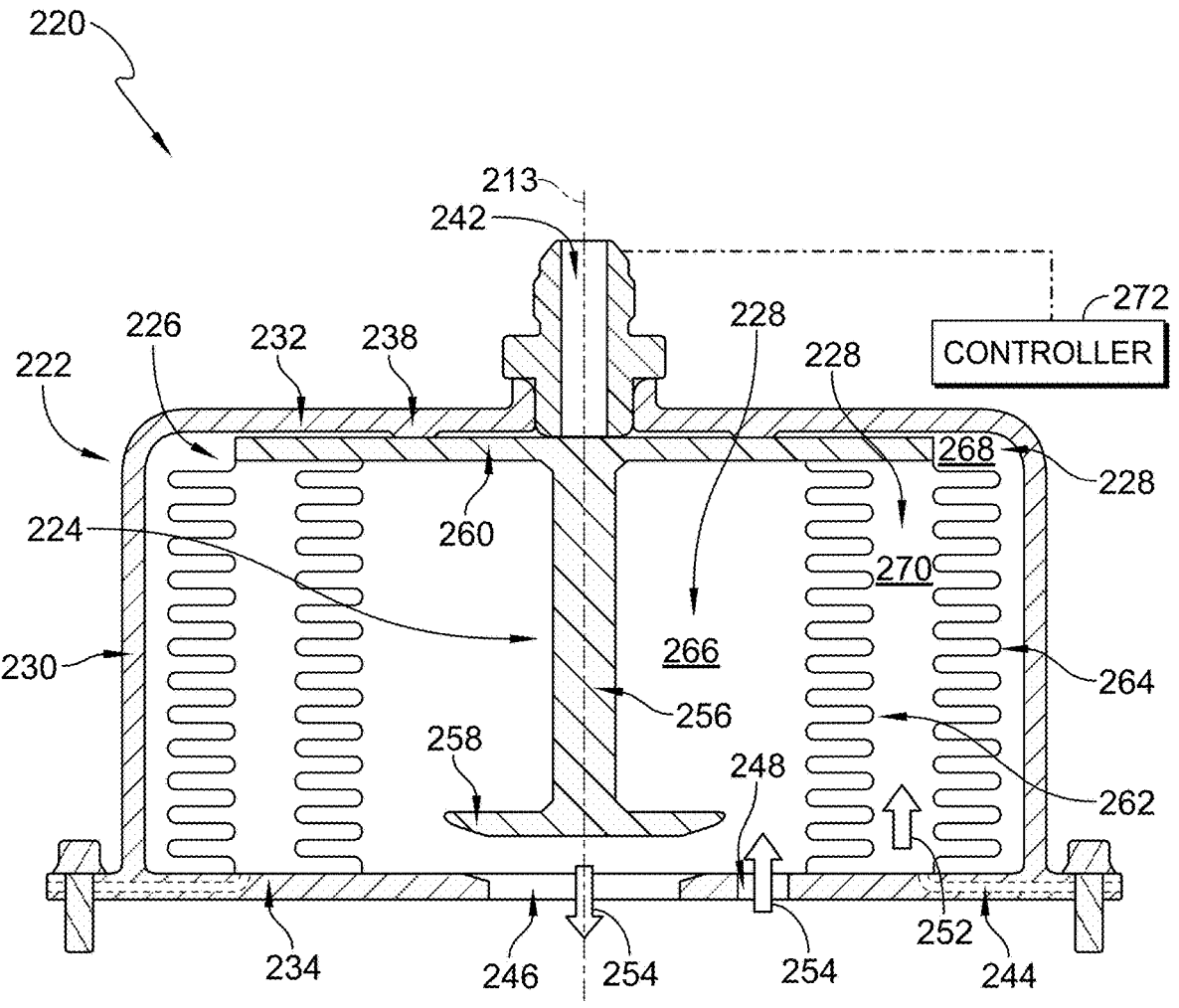
FIG. 6 is a cross section view the valve of FIG. 5 showing the valve in the opened position.

Another valve 220 in accordance with the present disclosure is shown in FIGS. 5 and 6. The valve 220 is substantially similar to the valve 20 shown in FIGS. 1-4 and described herein. Accordingly, similar reference numbers in the 200 series indicate features that are common between the valve 20 and the valve 220. The description of the valve 20 is incorporated by reference to apply to the valve 220, except in instances when it conflicts with the specific description and the drawings of the valve 220.

The valve 220 includes a valve body 222, a valve stem 224, and an actuator 226 as shown in FIGS. 5 and 6. The valve body 222 is formed to define an air chamber 228 therein. The valve stem 224 is configured to move between a closed position, shown in FIG. 5, and an open position, shown in FIG. 6, to control the flow of air through the valve 220. The actuator 226 is configured to move selectively the valve stem 224 between the closed position and the open position.

The valve body 222 includes a sidewall 230 that extends circumferentially around an axis 213 of the valve body 222, a top wall 232, a bottom wall 234 spaced axially from the top wall 232, and a valve stop 238 as shown in FIGS. 5 and 6. The valve stop 238 extends axially away from the top wall 232 towards the bottom wall 234 to block axial movement of the valve stem 224 past the open position to prevent failure of the actuator 226.

The valve body 222 is also formed to define a supply inlet 242, a pilot inlet 244, an upstream flow inlet 248, and a downstream flow outlet 246 as shown in FIGS. 5 and 6. The supply inlet 242 is formed in the top wall 232 and allows control air 250 to enter the air chamber 228. The pilot inlet 244 is formed in the bottom wall 234 and allows pilot air 252 into the air chamber 228. The upstream flow inlet 248 is also formed in in the bottom wall 234 and allows working air 254 to enter the air chamber 228. The downstream flow outlet 246 is also formed in the bottom wall 234 radially inward of the upstream flow inlet 248 and selectively allows the working air 254 to exit the valve body 222 through the downstream flow outlet 246.

The valve stem 224 includes a rod 256, a seat 258 coupled to the rod 256, and a mount flange 260 spaced axially from the seat 58 and coupled to the rod 256 as shown in FIGS. 5 and 6. The rod 256 defines the axial displacement of the actuator 226. The seat 258 is configured to block the downstream flow outlet 246 when the valve 220 is in the closed position. The mount flange 260 is coupled to the actuator 226 and is adapted to contact the valve stop 238 when the valve 220 is in the open position.

The actuator 226 includes a first bellows 262 and a second bellows 264. The first bellows 262 is coupled with the mount flange 260 and the bottom wall 234 to define a working fluid chamber 266. The working fluid chamber 266 is in fluid communication with the upstream flow inlet 248 and the downstream flow outlet 246 when the valve stem 224 is in the open position. The second bellows 64 is also coupled with the mount flange 260 and the bottom wall 234 to define a supply fluid chamber 268. The supply fluid chamber 268 is in fluid communication with the supply inlet 242. Additionally, the bottom wall 234, the first bellows 262, the second bellows 264, and the mount flange 260 cooperate to define a pilot fluid chamber 270. The pilot fluid chamber 270 is in fluid communication with the pilot inlet 244. In the illustrative embodiment, the second bellows 264 is radially outward of the first bellows 262 such that the second bellows 264 envelops the first bellows 262.

The valve stem 224 is movable between the closed position and the open position. In the closed position, the valve stem 224 blocks the downstream flow outlet 246 so that the working air 254 is blocked from flowing out of the working fluid chamber 266. In the open position, the valve stem 224 allows the working air 254 to flow through the downstream flow outlet 246.

In the open position, any control air 250 inside the supply fluid chamber 268 and the pilot air 252 inside the pilot fluid chamber 270 is ambient and/or a lower pressure than the working air 54. Meanwhile, the working air 254 has a first pressure equal to or about a first compressor discharge pressure inside the working fluid chamber 266. On the other hand, in the closed position, any control air 250 inside the supply fluid chamber 268 and any working air 254 inside the working fluid chamber 266 has a second pressure equal to or about a second compressor discharge pressure. Both the first pressure and the second pressure are greater than ambient air pressure. Meanwhile, the pilot air 252 inside the pilot fluid chamber 270 is ambient and/or a lower pressure than the control air 50 and/or the working air 54.

The valve 220 is configured to direct the valve stem 224 to move to or remain in the open position in response to either a failure of the first or second bellows 264, 266, or the control air 250 entering the supply inlet 242. In other words, the valve 220 is configured to mechanically always be open even if various components of the valve 220 should fail. Therefore, the default position for the valve 220 is the open position to ensure that cool (e.g., working) air is delivered to the turbine 18.

For example, if the first bellows 262 fails, then the working air 254 at the first pressure can distribute into both the working fluid chamber 266 and the pilot fluid chamber 270 and combine with the pilot air 252. In this scenario, the combined working fluid chamber 266 and the pilot fluid chamber 270 is not contaminated with any control air 250 from the supply fluid chamber 268. Furthermore, combined air 252, 254 that is at a higher pressure than ambient air is not sealed inside the pilot fluid chamber 270, but rather escapes to ambient air via pilot inlet 244. This keeps pilot fluid chamber 270 at a low enough pressure to allow the actuator 226 to function normally: closing when there is higher pressure air in the supply fluid chamber 268 and opening then there is lower pressure air in the supply fluid chamber 268. In other words, the pilot inlet 244 keeps the pilot fluid chamber 270 at a lower pressure to maintain the pressure delta across the second bellows 264. Pilot inlet 244 may be sized to keep the leak of working air 254 small while still allowing sufficient working air 254 to exit through downstream flow outlet 246 to cool the turbine 18.

Similarly, if the second bellows 264 fails, then the control air 250 will leak into the pilot fluid chamber 270. In this scenario, the working air 254 in the working fluid chamber 266 is not contaminated with any pilot air 252 or control air 250. Furthermore, combined air 250, 252, that is at a higher pressure than ambient air, is not sealed inside the pilot fluid chamber 270. Rather, the combined air 250, 252 escapes to ambient air via pilot inlet 244. The higher pressure of working air 54 in working fluid chamber 266 relative to pilot fluid chamber 270 will cause the valve stem to move to or remain in the open position since there is no pressure delta across the failed second bellows 264.

Finally, if there is a failure in supply inlet 242 or in the lines connecting controller 272 to inlet 242, then control air

250 entering the valve 220 will drop to ambient. The valve 220 is configured such that ambient air in supply fluid chamber 268 will cause the valve stem 224 to move to or remain in the open position.

In typical applications, bellows are used in the construction of actuators and valves. Valves 20, 220 with bellows work based on a pressure difference between the two sides of the bellows. Valves 20, 220 with bellows have advantages over other valves in that there are no sliding joints which can fail due to contamination in the air and that the bellows are fully sealed. However, a valve 20, 220 with a single bellows can fail to an undesired position, such as a closed position. For example, if the single bellows fails in the closed position, the pilot fluid chamber and the supply fluid chamber may both fill with air having high pressure. In some embodiments, the valves 20, 220 may be coupled to a controller 72, 272.

In some embodiments, in response to low flow conditions, i.e. when lower amounts of cooling air are used such as cruise, landing, taxiing, or climb, the controller 72, 272 may direct the valve 20, 220 to be in the closed position as shown in FIGS. 2, 3, and 5. In this way, only the minimum amount of cooling air is supplied to the turbine 18, as indicated by arrow A. Likewise, in some embodiments in response to high flow conditions, i.e. when larger amounts of cooling air are used such as max takeoff or climb, the controller 72 may direct the valve 20, 220 to be in the open position as shown in FIGS. 3 and 6. This allows a flow of cooling air to flow into the upstream flow inlet 48, 248, through the working fluid chamber 66, 266, out the downstream flow outlet 46, 246, and through the transfer passageway 36 to the cavity 19 to increase the amount of cooling air provided to the cavity 19.

The present disclosure includes a valve 20, 220 having a first bellows 62, 262 and a second bellows 64, 264. Thus, should the first bellows 62, 262 or the second bellows 64, 264 fail, or should control air 50, 250 enter the supply inlet 42, 242, the valve stem 24, 224 fails in the open position.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine comprising
   a combustor including an outer combustor case, an inner combustor case that cooperates with the outer combustor case to define a combustion chamber, and a cooling duct coupled to the outer combustor case, and
   a valve coupled with the outer combustor case, the valve comprising:
   a valve body formed to define an air chamber therein, the valve body formed to define a supply inlet for allowing control air to enter the air chamber, a pilot inlet for allowing pilot air into the air chamber, an upstream flow inlet for allowing working air to enter the air chamber from the combustion chamber, and a downstream flow outlet for selectively allowing the working air to exit the valve body through the downstream flow outlet into the cooling duct,
   a valve stem configured to move between a closed position in which the valve stem engages the valve body to close the downstream flow outlet such that the working air is blocked from flowing out of the air chamber and into the cooling duct and an open position in which the valve stem is spaced apart from the valve body to open the downstream flow outlet and allow the working air to flow through the downstream flow outlet and into the cooling duct, and
   an actuator configured to move selectively the valve stem between the closed position and the open position, the actuator including a first bellows coupled with the valve stem and the valve body to define a working fluid chamber that is in fluid communication with the upstream flow inlet and the downstream flow outlet when the valve stem is in the open position and a second bellows coupled with the valve stem and the valve body to define a supply fluid chamber in fluid communication with the supply inlet, and wherein the valve body, the first bellows, and the second bellows cooperate to define a pilot fluid chamber that is in fluid communication with the pilot inlet.

2. The gas turbine engine of claim 1, wherein the valve stem includes a rod, a seat, and a mount flange, and the second bellows is coupled with the mount flange and the valve body.

3. The gas turbine engine of claim 2, wherein the first bellows is coupled with the valve body and the seat.

4. The gas turbine engine of claim 2, wherein the first bellows is coupled with the valve body and the mount flange.

5. The gas turbine engine of claim 1, wherein the valve body includes a sidewall that extends circumferentially around an axis, a top wall, and a bottom wall.

6. The gas turbine engine of claim 5, wherein the pilot inlet is formed in the sidewall, and wherein the second bellows is positioned axially from the first bellows relative to the axis.

7. The gas turbine engine of claim 5, wherein the pilot inlet is formed in the bottom wall, and wherein the second bellows is radially outward of the first bellows relative to the axis such that the second bellows encloses the first bellows.

8. The gas turbine engine of claim 5, wherein the valve body is formed to include a valve stop that extends axially away from the top wall to block axial movement of the valve stem opposite the upstream flow inlet past the open position to prevent failure of the first bellows.

9. The gas turbine engine of claim 1, wherein the entire valve is located radially outward of the outer combustor case.

10. The gas turbine engine of claim 1, further comprising a turbine fluidly coupled to the combustor and configured to receive the working air from the cooling duct to cool components of the turbine.

11. A gas turbine engine comprising
    a combustor including an outer combustor case, an inner combustor case that cooperates with the outer combustor case to define a combustion chamber, and a cooling duct coupled to the outer combustor case, and
    a valve coupled to the outer combustor case, the valve comprising:
    a valve body formed to define an air chamber therein, the valve body formed to define a first inlet for allowing a first air to enter the air chamber, a second inlet for allowing a second air into the air chamber, a third inlet for allowing a third air to enter the air chamber from the combustion chamber, and an outlet for selectively allowing the third air to exit the valve body through the outlet into the cooling duct,
    a valve stem configured to move between a closed position in which the valve stem engages the valve body to close the outlet such that the third air is blocked from flowing out of the air chamber into the cooling duct and an open position in which the valve stem is spaced apart from the valve body to open the outlet and allow the third air to flow through the outlet and into the cooling duct, and an actuator configured to move selectively the valve stem between the closed position and the open position, the actuator including a first bellows coupled with the valve stem and the valve body to define a first fluid chamber that is in fluid communication with the third inlet and the outlet when the valve stem is in the open position and a second bellows coupled with the valve stem and the valve body to define a second fluid chamber in fluid communication with the first inlet, and wherein the valve body, the first bellows, and the second bellows cooperate to define a third fluid chamber that is in fluid communication with the second inlet.

12. The gas turbine engine of claim 11, wherein the valve stem includes a rod, a seat, and a mount flange, and the second bellows is coupled with the mount flange and the valve body.

13. The gas turbine engine of claim 12, wherein the first bellows is coupled with the valve body and the seat.

14. The gas turbine engine of claim 12, wherein the first bellows is coupled with the valve body and the mount flange.

15. The gas turbine engine of claim 11, wherein the valve body includes a sidewall that extends circumferentially around an axis, a top wall, and a bottom wall.

16. The gas turbine engine of claim 15, wherein the second inlet is formed in the sidewall, and wherein the second bellows is positioned axially from the first bellows relative to the axis.

17. The gas turbine engine of claim 15, wherein the second inlet is formed in the bottom wall.

18. The gas turbine engine of claim 15, wherein the second bellows is radially outward of the first bellows relative to the axis such that the second bellows encloses the first bellows.

19. The gas turbine engine of claim 15, wherein the valve body is formed to include a valve stop that extends axially away from the top wall to block axial movement of the valve stem opposite the third inlet past the open position to prevent failure of the first bellows.

20. The gas turbine engine of claim 11, wherein the entire valve is located radially outward of the outer combustor case.

\*    \*    \*    \*    \*